(12) United States Patent
Zhang et al.

(10) Patent No.: US 10,815,380 B2
(45) Date of Patent: Oct. 27, 2020

(54) COMPOSITE PIGMENTS

(71) Applicants: Zhenzhong Zhang, Sandersville, GA (US); Yaping Li, Evans, GA (US)

(72) Inventors: Zhenzhong Zhang, Sandersville, GA (US); Yaping Li, Evans, GA (US)

(73) Assignee: Thiele Kaolin Company, Sandersville, GA (US)

( * ) Notice: Subject to any disclaimer, the term of this patent is extended or adjusted under 35 U.S.C. 154(b) by 0 days.

(21) Appl. No.: 15/333,332

(22) Filed: Oct. 25, 2016

(65) Prior Publication Data
US 2017/0037250 A1 Feb. 9, 2017

Related U.S. Application Data

(62) Division of application No. 13/998,217, filed on Oct. 3, 2013, now Pat. No. 9,505,933.

(51) Int. Cl.
| | |
|---|---|
| *C09C 1/00* | (2006.01) |
| *C09C 1/40* | (2006.01) |
| *C09C 1/02* | (2006.01) |
| *C09C 1/36* | (2006.01) |

(52) U.S. Cl.
CPC .......... *C09C 1/0093* (2013.01); *C09C 1/0081* (2013.01); *C09C 1/0084* (2013.01); *C09C 1/021* (2013.01); *C09C 1/3653* (2013.01); *C09C 1/402* (2013.01); *C01P 2004/03* (2013.01); *C01P 2004/53* (2013.01); *C01P 2004/61* (2013.01); *C01P 2004/62* (2013.01); *C01P 2004/80* (2013.01); *C01P 2006/12* (2013.01); *C01P 2006/60* (2013.01)

(58) Field of Classification Search
CPC .... C09C 1/02; C09C 1/36; C09C 3/06; C09C 1/42
See application file for complete search history.

(56) References Cited

U.S. PATENT DOCUMENTS

| | | |
|---|---|---|
| 4,640,716 A | 2/1987 | Cleland |
| 4,738,726 A | 4/1988 | Pratt et al. |
| 5,068,276 A | 11/1991 | Suitch et al. |
| 5,152,835 A | 10/1992 | Nemeh |
| 5,168,083 A | 12/1992 | Matthews et al. |
| 5,336,311 A | 8/1994 | Curtis et al. |
| 5,584,925 A | 12/1996 | Maxwell et al. |
| 5,690,728 A | 11/1997 | Ravishankar |
| 6,004,467 A | 12/1999 | Bleakley |
| 6,143,064 A | 11/2000 | Virtanen |
| 6,440,209 B1 | 8/2002 | Ravishankar et al. |

FOREIGN PATENT DOCUMENTS

| | | |
|---|---|---|
| JP | 54-008632 | 1/1979 |
| JP | 2003522271 | 7/2003 |

OTHER PUBLICATIONS

Translation of a portion of JP54-008632.
Translation of a portion of JP2003-522271.

*Primary Examiner* — Pegah Parvini
(74) *Attorney, Agent, or Firm* — Baker Donelson

(57) ABSTRACT

Composite pigments are provided which comprise a mineral pigment (such as kaolin clay, titanium dioxide, talc, mica or a mixture of two or more of these mineral pigments) and calcium carbonate precipitated in-situ on the surfaces of the particles of the mineral pigment.

26 Claims, 3 Drawing Sheets

COMPOSITE PIGMENTS

TECHNICAL FIELD

This invention relates to composite pigments. In a more specific aspect, this invention relates to composite pigments having high brightness, fine particle size and narrow particle size distribution. The composite pigments of this invention yield high brightness and high opacity, improved coverage properties, but maintain the desired high gloss for paper coating applications.

In a more specific aspect, this invention relates to composite pigments which are produced by the in-situ precipitation of calcium carbonate on the surfaces of mineral pigment particles.

This invention also relates to a process for the manufacture of composite pigments which are produced by the in-situ precipitation of calcium carbonate on the surfaces of mineral pigment particles.

This invention will be described with specific reference to kaolin clay as the mineral pigment (or substrate) upon which the calcium carbonate is precipitated in-situ. However, this invention will be understood as applicable to other mineral pigments as the substrate, such as titanium dioxide, talc and mica. Additionally, the mineral pigment can be a mixture of two or more of these mineral pigments.

This invention further relates to coating compositions which contain kaolin/in-situ precipitated calcium carbonate composite pigments, whereby such coating compositions provide high brightness, high gloss, high opacity and improved coverage properties to coated sheets.

BACKGROUND OF THE INVENTION

Papermakers conventionally apply coatings to improve the appearance and performance of their paper products, including brightness, gloss, smoothness, opacity and printability. Three main types of mineral pigments have been widely used in coatings in the paper industry: kaolin clay, ground and precipitated calcium carbonate and titanium dioxide. Each type of mineral pigment has its own characteristic properties and brings certain benefits to the paper coatings.

Kaolin clay pigments have been used widely by the paper industry for many years. Perhaps the most common and important kaolin mineral for the paper industry is kaolinite, a hydrous aluminosilicate with a theoretical composition of $[Al_2Si_2O_5(OH)_4]$. The kaolinite structure is composed of a single silicate tetrahedral sheet and a single alumina octahedral sheet arranged so that the tips of the silicate tetrahedrons and one of the layers of alumina octahedral sheet share a common plane. Electron micrographs of well-crystallized kaolinite show hexagonal shaped platy particles, while poorly crystallized kaolinite occurs in less distinct hexagonal shaped particles.

Like other natural mineral pigments, kaolin clays contain some minor impurities, such as $TiO_2$ and $Fe_2O_3$, and kaolin clays which contain these impurities generally have a low brightness and an undesirable color. The kaolin industry uses various beneficiation processes to improve the brightness and color of kaolin products. Because of its unique structure and platy particle shape, kaolin clays are widely used to improve runnability of coating formulations and to enhance brightness, gloss, smoothness and printability of a coated sheet.

In recent years, ground calcium carbonate (GCC) and precipitated calcium carbonate (PCC) pigments are finding increasing use by the paper industry. Both GCC and PCC pigments have high brightness and desirable color (blue tint), which also translate into high brightness of coated sheets. However, both GCC and PCC tend to yield lower sheet gloss and poorer printing performance as compared to kaolin clays.

The unique platy shape of kaolin particles enhances sheet gloss, smoothness and printability. However, the platy shape of kaolin particles tend to yield a tight packing structure that is not generally effective for light scattering. To improve light scattering and opacity of the coated sheet, papermakers typically add $TiO_2$ pigments to their coating formulations. Titanium dioxides are highly effective for light scattering because of their high refractive index values (for example, anatase 2.53 and rutile 2.73). However, both forms of $TiO_2$ are expensive.

The kaolin clay industry has developed various technologies to enhance light scattering properties of kaolin clays, and these technologies include:

(1) Engineered pigments produced by mechanically modifying particle size and particle size distribution. This is generally achieved using multiple centrifugation steps. Typically, an engineered clay is made by producing a fine fraction from a particular crude blend. Then the ultrafine particles are reduced by a second centrifugation. The resulting engineered clay pigments have a narrower particle size distribution as compared to that of the feed materials.

For example, Matthews et al. U. S. Pat. No. 5,168,083 discloses a method of producing a high opacity kaolin pigment by defining an aqueous kaolin slurry via centrifugation to remove a substantial portion of colloidal particles. Prior to the defining step, the aqueous kaolin slurry is mechanically dispersed, ground to break up agglomerates and centrifuged to remove large kaolin particles. The resulting pigments with a narrow particle size distribution yield a coating with special packing characteristics and high porosity. Such a coating is more efficient in light scattering and, therefore, provides improved brightness and opacity to a coated sheet.

The engineered pigments generally perform well in paper coating applications; however, the high production cost and low recovery rate from clay crudes limit their use to high end specialty grades.

(2) Chemically structured pigments produced by aggregating the kaolin particles through the use of various organic polymers (such as Pratt et al. U.S. Pat. No. 4,738,726), various inorganic compounds (such as Cleland U.S. Pat. No. 4,640,716, Maxwell and Malla U.S. Pat. No. 5,584,925 and Ravishankar U.S. Pat. No. 5,690,728), or inorganic compounds combined with an organic polymer (such as disclosed in Suitch et al. U.S. Pat. No. 5,068,276).

Pratt et al. U. S. Pat. No. 4,738,726 teaches a high bulking opacifying pigment produced by flocculating hydrous kaolin particles with a minor amount of a cationic polyelectrolyte flocculant, such as a quaternary ammonium polymer salt. There are some limited successes in these technologies for certain specialty grades. This approach is based on the idea to establish and stabilize an open structure for the pigments. Cleland U.S. Pat. No. 4,640,716 teaches using a zirconium ion, such as ammonium zirconium carbonate, to enhance optical properties of the pigment. Maxwell and Malla U.S. Pat. No. 5,584,925 teaches using phosphate compounds to improve the light scattering (opacity), gloss and ink receptivity of the pigment. Ravishankar U.S. Pat. No. 5,690,728 teaches using poly aluminum chloride to produce chemically aggregated pigment.

Suitch et al. U.S. Pat. No. 5,068,276 teaches forming bulked aggregates of mineral particles by adding a polyvalent cation to flocculate the mineral particles and adding polyacrylic acid to cross-link with the polyvalent cation and to cause in situ precipitation of polyacrylate salt on the mineral particle flocs.

(3) Thermally structured pigments by calcining fine particle size hard kaolin (gray kaolin) crudes. This technology has achieved success in paper filling as well as in paper coating applications.

Many major kaolin producers produce one or more calcined grades. These calcined products have high brightness and excellent light-scattering properties, and they are widely used by paper makers as an extender or as a replacement for the more expensive $TiO_2$ pigments. Some of these calcined kaolin pigments, such as the product marketed by Thiele Kaolin Company under the trademark KAOCAL, also bring additional benefits to the coated sheet and are used in various proprietary grades and specialty products by papermakers. However, the calcined pigments have some negative attributes, such as abrasiveness and dilatancy (poorer Hercules viscosity) as compared to hydrous kaolin pigments.

Composite pigments containing at least two pigments from the group that includes kaolin clays, $TiO_2$, precipitated calcium carbonate, talc and other minerals have been developed for improving performance of filler and coating applications. Examples of these composite pigments include:

A. Composite pigments of calcined kaolin and $TiO_2$ bound together in the form of coherent aggregates using cationic polymers. Nemeh U.S. Pat. No. 5,152,835 teaches binding calcined kaolin and titania pigment using a quaternary ammonium salt polymer. Curtis et al. U.S. Pat. No. 5,336,311 discloses a method for making cationic pigments comprises calcined kaolin and titanium dioxide bounded by a microgel and cationized by epichlorhydrin dimethylamine condensate.

B. Composite pigments of kaolin clay and $TiO_2$ bound together by thermal treatment (calcinations).

C. Composite pigments of hydrous or calcined kaolin and precipitated calcium carbonate (or other metal carbonate) formed via surface coating. Virtanen U.S. Pat. No. 6,143,064 teaches blending an ultra fine precipitated calcium carbonate that ranges in particle size from 30 to 100 nm with another mineral pigment, such as kaolin clay. It is claimed such fine particles of calcium carbonate are attached to the surfaces of pigment particles selected from a group consists of kaolin, calcium carbonate, titanium dioxide and mixtures of such particles.

D. Composite pigments of precipitated calcium carbonate formed in-situ on kaolin clay particles. Bleakely U.S. Pat. No. 6,004,467 teaches a process for aggregating kaolin clay particles by means of precipitation of quicklime (calcium oxide) in the presence of such kaolin clay. However, since kaolin slurry becomes extremely viscous when calcium oxide is added, this approach works only for a slurry at very low solid contents (5 to 7.5% cited in this patent).

Ravishankar et al. U.S. Pat. No. 6,440,209 improved this process by adding portions of a slaked lime slurry (calcium hydroxide) to the kaolin slurry, followed by carbonation after each slaked lime addition. This improvement allowed a higher solid content of the kaolin slurry at 20%. In addition, this patent revealed that in-situ precipitation of calcium carbonate helped to reduce the content of ultrafine particles without necessitating physical removal of slimes. However, in addition to the desired effect to limit the content of ultrafine particles (such as <0.2 micron), the process in this patent also significantly reduced the contents of fine particles (such as <2 micron and <1 micron). As reported in Table 1 of this patent, the <2 micron particles were reduced from 80% for the Nuclay feed to 61-63% for the resulting composite pigments with 20-30% PCC. The reduction of content of fine particles is undesirable for paper coating applications.

Consequently, there is a need in the industry for a mineral pigment/in-situ precipitated calcium carbonate composite pigment which will provide high brightness, high gloss, high opacity and improved coverage to a coated sheet.

SUMMARY OF THE INVENTION

Briefly described, the present invention provides composite pigments which contain a mineral pigment (such as kaolin clay) and in-situ precipitated calcium carbonate. The present invention also provides coating compositions which contain composite pigments with improved brightness and narrow particle size distribution. These composite pigments and coating compositions provide high brightness, high gloss, high opacifying and improved coverage properties for coated sheets.

The present invention provides a process for the manufacture of (a) these composite pigments with significantly reduced content of ultrafine particles while maintaining or slightly increasing the content of fine particles (1-2 microns) and (b) coating compositions which contain these composite pigments.

These and other features and advantages of this invention will become apparent from the following detailed description.

BRIEF DESCRIPTION OF THE DRAWINGS

FIG. 1 shows the presence of discrete calcium carbonate particles on the surface of the kaolin clay particles.

FIG. 2 shows the presence of a uniform calcium carbonate coating and the absence of discrete calcium carbonate particles on the surface of the kaolin clay particles.

FIG. 3 shows the presence of discrete calcium carbonate particles on the surface of the kaolin clay particles.

DETAILED DESCRIPTION OF THE INVENTION

Figure 1:
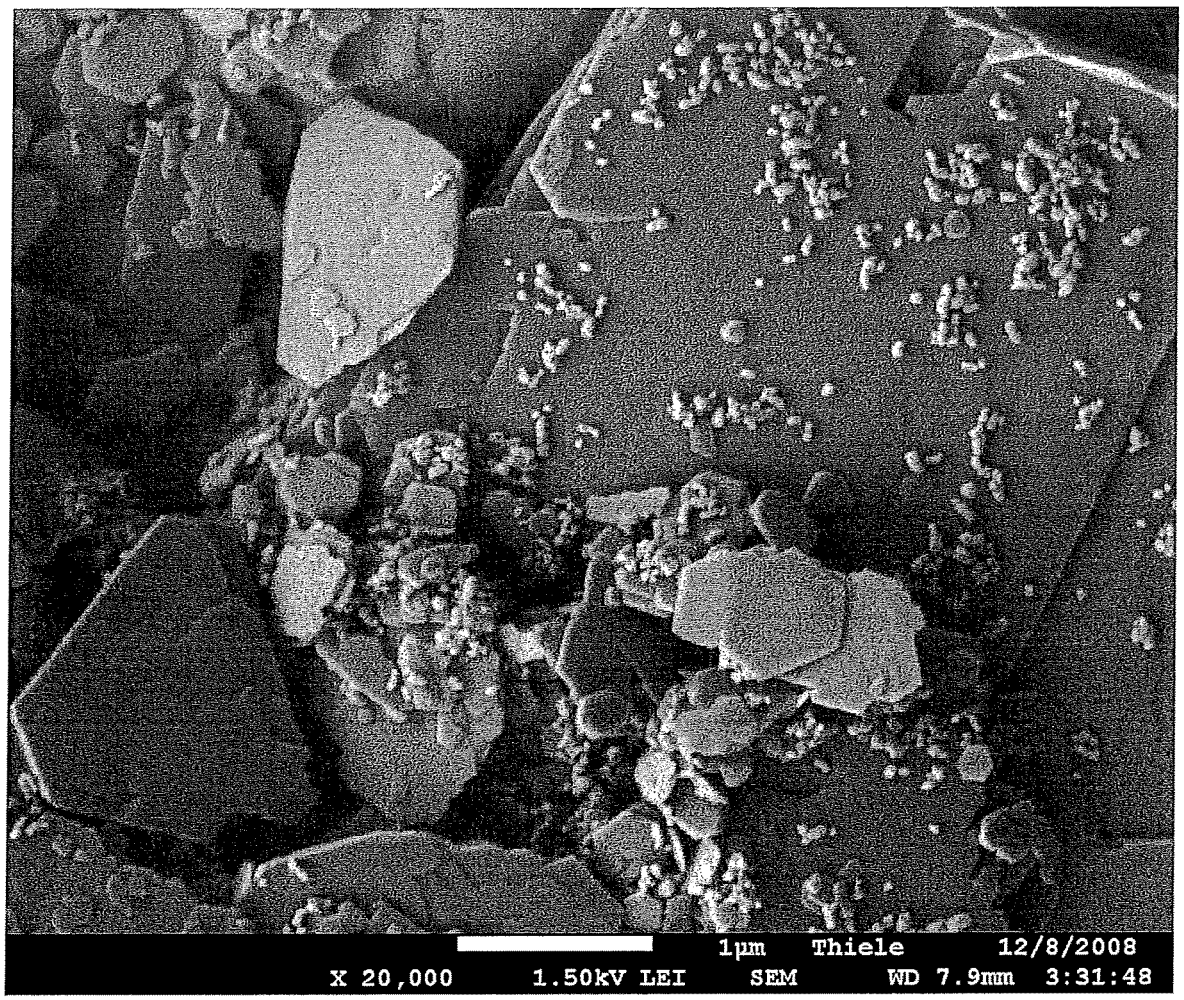
FIG. 1 is a scanning electron micrograph of a composite pigment with 20% calcium carbonate synthesized using 5 carbonation cycles, with 3.7% $Ca(OH)_2$ (slaked lime) added per carbonation cycle.

In accordance with the present invention, a high brightness, high gloss, high opacifying, high bulking composite pigment is provided which is comprised of a mineral pigment (preferably kaolin clay) and in-situ precipitated calcium carbonate.

The kaolin clay of the composite pigment of this invention can be in several forms, examples of which include hydrous kaolin clay, delaminated kaolin clay, calcined kaolin clay and mixtures of two or more of these clays.

Other mineral pigments can be used alone or in combination with the kaolin clay in this invention. Examples of such other mineral pigments include titanium dioxide, talc, mica and a mixture of two or more of these mineral pigments.

In this application, the term "in-situ precipitation" will be understood to mean the precipitation of calcium carbonate in the presence of kaolin clay particles. It is believed the precipitation reaction forms a thin layer of calcium carbonate coating on the kaolin clay particles, and that such coating may bind the ultra fine kaolin clay particles together to form larger aggregates.

In the precipitation reaction, a pre-determined amount of slaked lime (i.e., calcium hydroxide, such as can be made by adding water to quicklime) is added to kaolin clay to form a mixture. Carbon dioxide gas is then passed through the mixture until the pH of the mixture is about neutral (i.e., about 7.0).

In this application, the addition of slaked lime (calcium hydroxide) to a kaolin clay slurry and subsequent passing of carbon dioxide gas through the kaolin clay/slaked lime mixture is referred to as a "carbonation cycle". This invention uses a plurality (2 to 30) of carbonation cycles to obtain the desired composite pigment.

The number of carbonation cycles depends on the amount of calcium carbonate desired in the resulting composite pigment. For example, a composite pigment with 5% calcium carbonate can be synthesized using 2 to 3 carbonation cycles, whereas a composite pigment with 30% calcium carbonate typically takes 10 to 15 carbonation cycles to synthesize. In general, the amount of slaked lime added to the kaolin clay slurry is about 2.0 to about 3.0% per carbonation cycle based on the weight of the dry kaolin clay.

The present invention provides a method for making such composite pigments through precise control of the in-situ precipitation reaction process. The appropriate amount of calcium carbonate addition for each carbonation cycle is narrow and critical. An amount below the critical level makes the process inefficient, whereas an amount above the critical level results in composite pigments with undesirable particle size distribution and discrete PCC particles. The flow rate of $CO_2$ gas and mixing of the slurry are also critical. The mixing can be improved by adding a baffle to the reaction vessel.

The amount of calcium carbonate which is precipitated on the surfaces of the kaolin clay particles can vary depending on the desired final composite pigment. The amount of calcium carbonate generally is from about 5.0 to about 90.0 weight percent based on the weight of the dry composite pigment. A preferred amount of calcium carbonate is from about 10.0 to about 60.0 weight percent, more preferably from about 20.0 to about 40.0 weight percent, based on the weight of the dry composite pigment.

The present invention is further illustrated by the following examples which are illustrative of certain embodiments designed to teach those of ordinary skill in the art how to practice this invention and to represent the best mode contemplated for carrying out this invention.

For the following Examples, the following terms shall be defined as follows:

"Kaowhite S" is a trademark for a delaminated kaolin clay product from Thiele Kaolin Company of Sandersville, Ga.; also referred to in this application as "KWS".

"Printmax" is a trademark for a fine particle size delaminated kaolin clay product from Thiele Kaolin Company.

"CLC" refers to a cylindrical laboratory coater from Sensor & Simulation Products.

"LWC" refers to a light weight coating study.

"RSV" refers to relative sediment volume.

"KM" refers to Kubelka-Munk.

"Slaked lime" is a commonly known term for calcium hydroxide.

"Quicklime" is a commonly known term for calcium oxide.

"PSD" refers to particle size distribution.

"CC" refers to calcium carbonate.

"Carbonation Cycle" refers to the addition of slaked lime and subsequent passing of carbon dioxide through the mineral pigment/slaked lime mixture.

EXAMPLE 1

A total of 3,000 g PCC grade pebble quicklime from Graymont (PA) was slaked in warm tap water with a lime to water ratio of 1:5.5. The lime slaking was performed in a 5 gallon high density polyethylene (HDPE) container equipped with a mixer by slowing adding the quicklime into the warm water in a controlled temperature range of 30 to 90° C., preferably 50 to 70° C., to yield slaked lime $(Ca(OH)_2)$ with sufficient reactivity and fine particle size. The slaked lime slurry was degritted through a 325 mesh screen, which yielded a slurry at 17.8% solids.

Laboratory scale (3,000 g) composite pigments were synthesized in a specifically designed 7 gallon stainless steel reactor with a porous ceramic disk-shaped gas diffuser in the bottom. A slurry of Kaowhite S delaminated kaolin was prepared from spray dried product at 15% solids.

Two composite pigments with 20% calcium carbonate were synthesized using 5 and 9 carbonation cycles, and a composite pigment with 30% calcium carbonate was synthesized using 8 cycles. A predetermined amount of $Ca(OH)_2$ slurry was added to a KWS slurry, followed by delivering $CO_2$ gas to the slurry until the pH drops to 7. This process was repeated until the desirable amount of calcium carbonate was precipitated.

Figure 2:
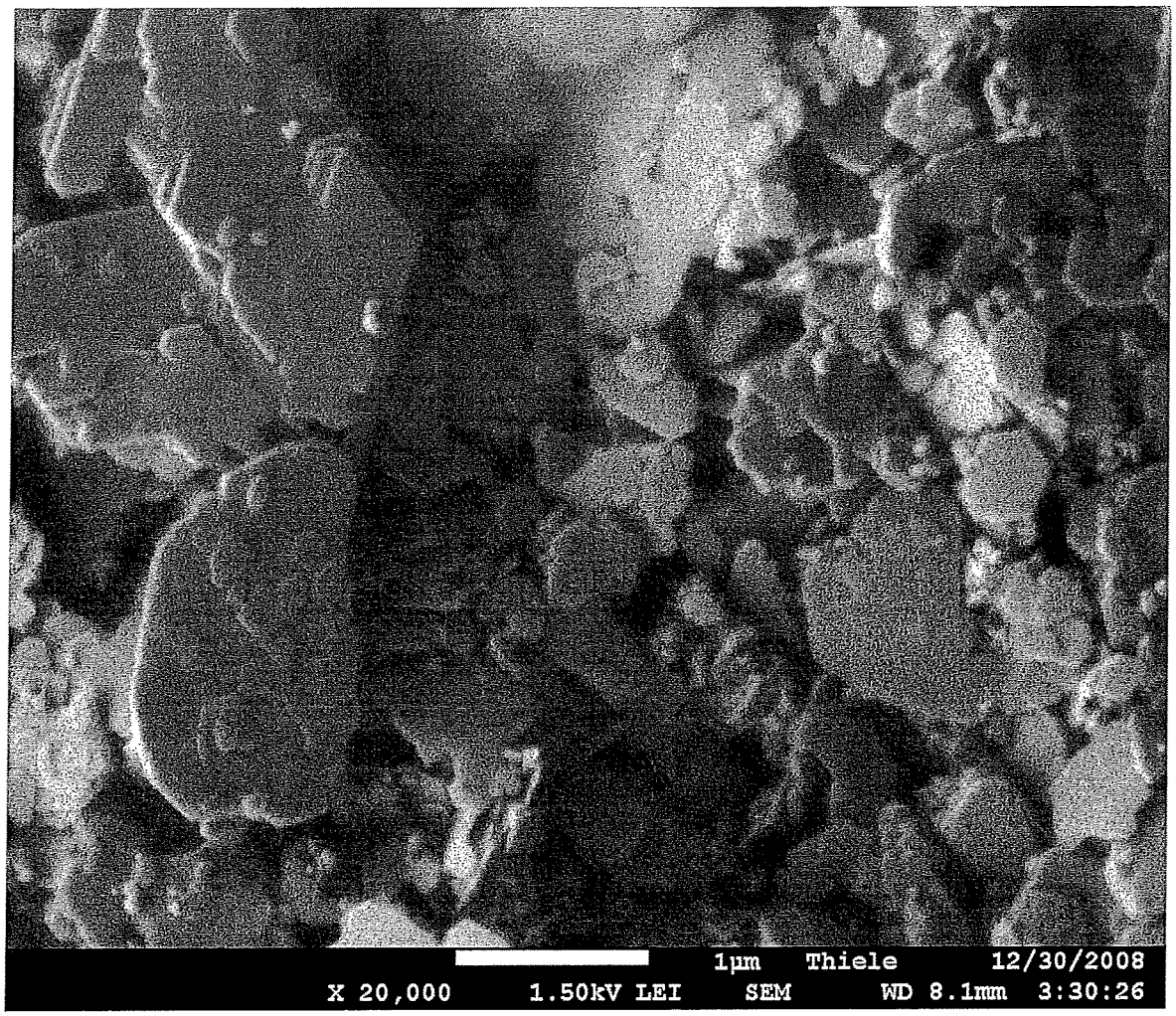
FIG. 2 is a scanning electron micrograph of a composite pigment of this invention with 20% calcium carbonate synthesized using 9 carbonation cycles, with 2.1% $Ca(OH)_2$ (slaked lime) added per carbonation cycle.
Figure 3:
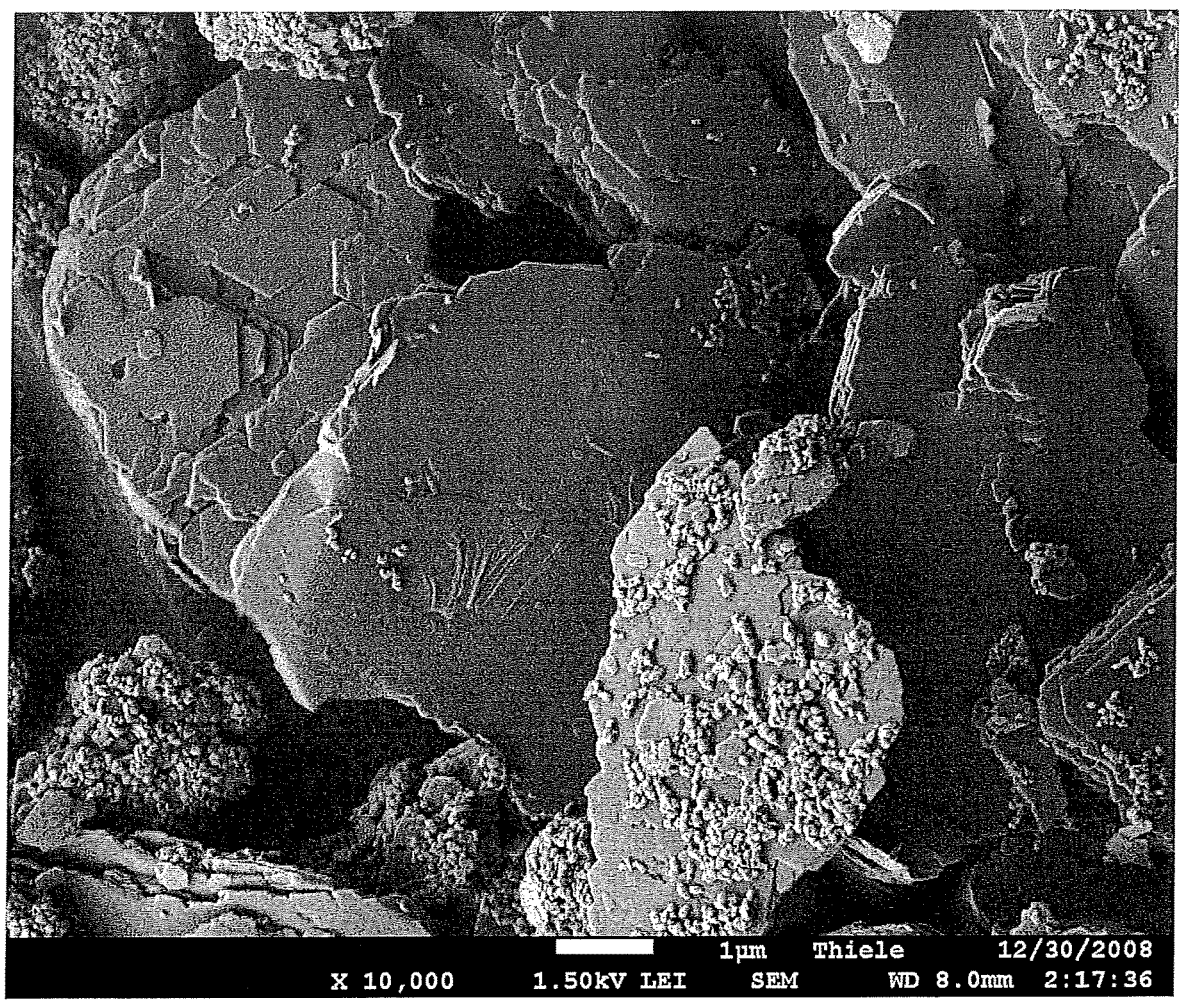
FIG. 3 is a scanning electron micrograph of a composite pigment with 30% calcium carbonate synthesized using 8 carbonation cycles, with 4.0% $Ca(OH)_2$ (slaked lime) added per carbonation cycle.

The experimental conditions and Sedigraph PSD, brightness, surface area of the resulting composite pigments along with KWS are reported in Table 1. The Scanning Electron Microscopy (SEM) images of these three composite pigments are shown in FIGS. 1-3.

TABLE 1

| Sample | KWS | KWS w/ 20% CC Composite Pigment 1 | KWS w/ 20% CC Composite Pigment 2 | KWS w/ 20% CC Composite Pigment 3 |
|---|---|---|---|---|
| KWS Slurry at 15% Solids kg | — | 16 | 16 | 14 |
| $Ca(OH)_2$ Slurry at 17.8% Solids g | — | 2,500 | 2,500 | 3,750 |
| No. of Carbonation Cycles | — | 5 | 9 | 8 |
| $Ca(OH)_2$ Slurry Added Per Cycle g | — | 500 | 278 | 469 |
| $Ca(OH)_2$ Added Per Cycle Based on KWS % | — | 3.7 | 2.1 | 4.0 |
| $CO_2$ Flow Rate L/min. | — | 2.0 | 2.0 | 2.0 |
| L/min. kg $Ca(OH)_2$ | — | 22.5 | 40.4 | 24.0 |
| Sedigraph PSD | | | | |
| % <5 µm | 97.8 | 97.9 | 98.6 | 98.2 |
| % <2 µm | 84.4 | 89.2 | 84.1 | 89.4 |
| % <1 µm | 68.0 | 73.1 | 60.6 | 68.3 |
| % <0.5 µm | 46.8 | 47.4 | 37.4 | 39.6 |
| % <0.2 µm | 23.0 | 22.0 | 16.8 | 14.4 |

TABLE 1-continued

| Sample | KWS | KWS w/ 20% CC Composite Pigment 1 | KWS w/ 20% CC Composite Pigment 2 | KWS w/ 20% CC Composite Pigment 3 |
|---|---|---|---|---|
| GE Brightness | 87.4 | 88.9 | 89.3 | 89.2 |
| BET Surface Area m$^2$/g | 15.64 | 19.75 | 16.86 | 19.48 |
| SEM micrographs | — | FIG. 1 | FIG. 2 | FIG. 3 |

The composite pigments synthesized with the above conditions yielded an unexpected particle size distribution, i.e., the content of ultrafine particles (<0.2 micron) was significantly reduced, whereas the content of fine particles (1-2 microns) was maintained or slightly increased compared to KWS, thus making the overall particle size distribution narrower.

The SEM images showed that the composite pigments shown in FIGS. 1 and 3, which were synthesized with 3.7 and 4.0% Ca(OH)$_2$ addition per carbonation cycle (based on KWS), yielded discrete calcium carbonate particles on the kaolin clay surfaces. The composite pigment shown in FIG. 2, which was synthesized with 2.1% Ca(OH)$_2$ addition per carbonation cycle, yielded a uniform calcium carbonate coating on the kaolin clay surfaces. The surface area data also showed that when a uniform calcium carbonate coating was formed, the resulting composite pigment has a lower surface area compared to that when discrete calcium carbonate particles were formed. A pigment with a lower surface area has a lower binder demand, which is a desired property for a pigment.

A CLC LWC offset coating study was performed for the composite pigments along with KWS as control. Coat weight, sheet gloss, GE and diffuse brightness and opacity are reported in Table 2. The data showed that the composite pigments shown in FIG. 2 with a uniform calcium carbonate coating (this invention) had significantly higher coated sheet brightness and opacity compared to the KWS control and the composite pigments shown in FIGS. 1 and 3 with discrete calcium carbonate particles formed.

TABLE 2

| Sample | KWS | KWS w/ 20% CC Composite Pigment 1 | KWS w/ 20% CC Composite Pigment 2 | KWS w/ 30% CC Composite Pigment 3 |
|---|---|---|---|---|
| Coat Weight lb/3300 ft$^2$ | 5.5 | 5.5 | 5.5 | 5.5 |
| Gloss % | 56 | 55 | 53 | 55 |
| GE Brightness % | 65.5 | 67.5 | 68.7 | 68.4 |
| Diffuse Brightness % | 65.9 | 67.4 | 68.7 | 67.9 |
| Opacity % | 84.6 | 84.7 | 85.6 | 84.7 |

It was demonstrated that the amount of Ca(OH)$_2$ added per carbonation cycle is critical. When this amount is above a critical value, discrete calcium carbonate particles are formed on the kaolin clay surfaces. Only when this amount is below a critical value, a uniform calcium carbonate coating on the kaolin surface is formed. Composite pigments with a uniform calcium carbonate coating have been shown to provide desirable coating performance.

EXAMPLE 2

A total of 3,000 g PCC grade quicklime from Cameuse Lime & Stone (Pittsburgh, Pa.) was slaked in warm tap water with a lime to water ratio of 1:5.5. The lime slaking was performed in a 5 gallon HDPE container equipped with a mixer by slowing adding the quicklime into the warm water in a controlled temperature range of 30 to 90° C., preferably 50 to 70° C., to yield a slaked lime (Ca(OH)$_2$) with sufficient reactivity and fine particle size. The slaked lime slurry was degritted through a 325 mesh screen, which yielded a slurry at 17.8% solids.

A spray dryer feed slurry of KWS was diluted to 15% solids. In this study the effect of CO$_2$ gas flow rate was evaluated.

Two composite pigments with 30% calcium carbonate were synthesized using 15 carbonation cycles, with 2.1% Ca(OH)$_2$ addition per carbonation cycle and two CO$_2$ gas flow rates (35 and 63 L/min.KgCa(OH)$_2$). The experimental conditions and brightness, Sedigraph PSD, surface area and rheology of the resulting composite pigments along with KWS are reported in Table 3. These composite pigments also have desirable PSD as those shown in Example 1.

The data showed that Composite Pigment 5, which was synthesized with a higher CO$_2$ gas flow rate, had a lower content of ultrafine particles compared to Composite Pigment 4, which was synthesized with a lower CO$_2$ gas flow rate. Thus, the data showed that a higher CO$_2$ flow rate (63 L/min.KgCa(OH)$_2$) is preferred over a lower CO$_2$ flow rate (35 L/min.KgCa(OH)$_2$). Nevertheless, the PSD of composite pigments from the present invention is unique that only the content of the ultrafine particle was reduced while contents of fine particles with 1-2 micron sizes were maintained or even slightly increased, resulting in optimal PSD. As a result, these composite pigments are expected to have improved light scattering properties and coated sheet properties compared to composite pigments of the prior art.

TABLE 3

| | KWS | KWS w/ 30% CC Composite Pigment 4 | KWS w/ 30% CC Composite Pigment 5 |
|---|---|---|---|
| KWS Slurry at 15% Solids kg | — | 14 | 14 |
| Ca(OH)$_2$ Slurry at 17.8% Solids g | — | 3,750 | 3,750 |
| No. of Carbonation Cycles | — | 15 | 15 |
| Ca(OH)$_2$ Slurry Added Per Cycle g | — | 250 | 250 |
| Ca(OH)$_2$ Added Per Cycle Based on KWS % | — | 2.1 | 2.1 |
| CO$_2$ Flow Rate L/min. | — | 1.56 | 2.8 |
| L/min. kg Ca(OH)$_2$ | — | 35 | 63 |
| Sedigraph PSD | | | |
| % <5 μm | 98.0 | 98.1 | 98.1 |
| % <2 μm | 84.9 | 90.4 | 90.0 |
| % <1 μm | 70.8 | 70.7 | 71.7 |
| % <0.5 μm | 53.3 | 39.3 | 37.8 |
| % <0.2 μm | 23.1 | 10.9 | 6.8 |
| GE Brightness | 88.1 | 90.4 | 90.4 |
| BET Surface Area m$^2$/g | 17.27 | 16.86 | 14.52 |
| Solids % | 67.1 | 65.0 | 66.7 |
| SPMA Dispersant lb/ton | — | 4.3 | 2.8 |
| pH | 6.5 | 8.5 | 8.6 |
| Brookfield (#2@20 rpm) cP | 160 | 1780 | 848 |
| Hercules rpm@18 Dynes | 575 | 561 | 128 |

A CLC LWC rotogravure coating study was performed for the composite pigments along with KWS as control. Coat weight, sheet gloss, GE and diffuse brightness, opacity and rotogravure printability are reported in Table 4.

Rotogravure printability was measured using the Heliotest total number of missing dots method. The Heliotest is an attachment for the IGT print tester and consists of an engraved disc with half-tone and printed line pattern, doctor blade system and a special ink. The print (110 mm in length and 7 mm in width) was made on the test paper, which is held against the printing wheel of an IGT print tester at constant force. The printability is measured in terms of length of print until 20 missing dots occur. The longer the distance from the beginning of printing to the 20$^{th}$ missing dot, the better the printability.

TABLE 4

|  | KWS | KWS w/30% CC Composite Pigment 4 | KWS w/30% CC Composite Pigment 5 |
|---|---|---|---|
| Coat Weight lb/3300 ft$^2$ | 5.0 | 5.0 | 5.0 |
| Gloss % | 47 | 44 | 43 |
| GE Brightness % | 67.4 | 69.8 | 71.1 |
| Diffuse Brightness % | 68.0 | 69.6 | 71.0 |
| Opacity % | 85.9 | 86.4 | 87.1 |
| Printability Length of print to 20$^{th}$ missing dots mm | 51 | 45 | 52 |

Note that both composite pigments yielded significantly improved coating performance compared to KWS. However, as expected from the PSD of the composite pigments, Composite Pigment 5 had improved coating performance compared to Composite Pigment 4. Coated sheet brightness and opacity were significantly improved compared to KWS and Composite Pigment 4, while the printability was maintained. This unique feature is advantageous as historically calcium carbonate pigments have been rarely used in rotogravure coating application due to poor rotogravure printability.

EXAMPLE 3

The same quicklime as used in Example 2 was slaked and degritted through a 325 mesh screen. A spray dryer feed slurry of Printmax kaolin was diluted to 15% solids. Four composite pigments with 30% calcium carbonate were synthesized using 11, 13, 15 and 18 carbonation cycles, corresponding to 2.9, 2.4, 2.1% and 1.8% Ca(OH)$_2$ addition per carbonation cycle, respectively. The experimental conditions and Sedigraph PSD and brightness of the resulting composite pigments along with the Printmax kaolin feed are reported in Table 5.

TABLE 5

| Sample | Printmax | Printmax w/ 30% CC Composite Pigment 6 | Printmax w/ 30% CC Composite Pigment 7 | Printmax w/ 30% CC Composite Pigment 8 | Printmax w/ 30% CC Composite Pigment 9 |
|---|---|---|---|---|---|
| No. of Carbonation Cycles | — | 11 | 13 | 15 | 18 |
| Ca(OH)$_2$ Added Per Cycle Based on Printmax % | — | 2.9 | 2.4 | 2.1 | 1.8 |
| CO$_2$ Flow Rate L/min. kgCa(OH)$_2$ | — | 65 | 65 | 65 | 65 |
| Sedigraph PSD |  |  |  |  |  |
| % <5 μm | 99.0 | 99.2 | 99.8 | 98.8 | 98.7 |
| % <2 μm | 92.8 | 92.9 | 93.9 | 93.7 | 94.6 |
| % <1 μm | 76.2 | 68.3 | 71.4 | 70.2 | 74.1 |
| % <0.5 μm | 47.2 | 36.4 | 38.5 | 36.8 | 38.9 |
| % <0.2 μm | 20.5 | 13.5 | 14.9 | 13.1 | 15.5 |
| GE Brightness | 87.8 | 89.3 | 89.2 | 89.3 | 89.4 |

A CLC LWC offset coating study was performed for the composite pigments along with Printmax kaolin as the control. Coat weight, sheet gloss, GE and diffuse brightness and opacity are reported in Table 6. The data are in excellent agreement with Example 1, namely a lower amount of Ca(OH)$_2$ addition per carbonation cycle, 1.8 to 2.4% based on weight of Printmax kaolin, yielded improved pigment properties and coating performance.

TABLE 6

| Sample | Printmax | Printmax w/30% CC Composite Pigment 6 | Printmax w/30% CC Composite Pigment 7 | Printmax w/30% CC Composite Pigment 8 | Printmax w/30% CC Composite Pigment 9 |
|---|---|---|---|---|---|
| Coat Weight lb/3300 ft$^2$ | 5.5 | 5.5 | 5.5 | 5.5 | 5.5 |
| Gloss % | 57 | 54 | 54 | 55 | 56 |
| GE Brightness % | 67.9 | 69.8 | 70.0 | 70.4 | 70.7 |
| Diffuse Brightness % | 67.7 | 69.0 | 69.2 | 69.4 | 69.8 |
| Opacity % | 85.4 | 85.6 | 85.7 | 85.8 | 86.0 |

EXAMPLE 4

Pilot plant scale (70 lb.) composite pigments were synthesized in a specifically designed 55 gallon reactor with two AFD270 EPDM membrane disc diffusers in the bottom. Cameuse quicklime was slaked in a 50 gallon drum and degritted through a 325 mesh screen. Liquid CO$_2$ from Air Gas South was used as the CO$_2$ source. A spray dryer feed slurry of KWS was diluted to 15% solids. Three composite pigments with 30% calcium carbonate were synthesized using 5, 10 and 15 carbonation cycles, corresponding to 6.3, 3.2 and 2.1% Ca(OH)$_2$ addition per carbonation cycle, respectively. For comparison, a composite pigment was synthesized in the lab reactor using the same feed materials with 15 carbonation cycles. The experimental conditions, Sedigraph PSD and brightness of the resulting composite pigments along with KWS are reported in Table 7.

A CLC LWC offset coating study was performed for the composite pigments along with KWS as the control. Coat weight, sheet gloss, GE and diffuse brightness and opacity are reported in Table 8. The data showed that the pilot plant scale reactor produced an optimum performance composite pigment with 30% calcium carbonate using 10 carbonation cycles (Composite Pigment 11), compare to lab scale composite pigments with 30% calcium carbonate using 15 carbonation cycles (Composite Pigment 5, Composite Pigment 8, Composite Pigment 13).

TABLE 7

|  | Pilot Plant Scale | | | Lab scale |
| --- | --- | --- | --- | --- |
| Sample | KWS | KWS w/ 30% CC Composite Pigment 10 | KWS w/ 30% CC Composite Pigment 11 | KWS w/ 30% CC Composite Pigment 12 | KWS w/ 30% CC Composite Pigment 13 |
| PCC (%) | — | 30 | 30 | 30 | 30 |
| No. of Carbonation Cycles | — | 5 | 10 | 15 | 15 |
| Ca(OH)$_2$ Added Per Cycle Based on KWS % | — | 6.3 | 3.2 | 2.1 | 2.1 |
| CO$_2$ flow rate (L/min. kgCa(OH)$_2$) Sedigraph PSD | — | 75 | 75 | 75 | 75 |
| % <5 μm | 98.2 | 98.9 | 98.8 | N/A | 98.5 |
| % <2 μm | 84.3 | 91.5 | 91.1 | | 89.5 |
| % <1 μm | 69.0 | 77.9 | 75.9 | | 69.1 |
| % <0.5 μm | 50.2 | 49.3 | 37.9 | | 35.9 |
| % <0.2 μm | 23.2 | 17.6 | 9.7 | | 10.7 |
| GE Brightness | 88.1 | 90.0 | 90.1 | 89.2 | 89.9 |

TABLE 8

|  | Pilot Plant Scale | | | Lab scale |
| --- | --- | --- | --- | --- |
| Sample | KWS | KWS w/ 30% CC Composite Pigment 10 | KWS w/ 30% CC Composite Pigment 11 | KWS w/ 30% CC Composite Pigment 12 | KWS w/ 30% CC Composite Pigment 13 |
| Coat Weight lb/3300 ft$^2$ | 5.5 | 5.5 | 5.5 | 5.5 | 5.5 |
| Gloss % | 58 | 61 | 58 | 49 | 58 |
| GE Brightness % | 68.8 | 72.0 | 72.8 | 71.7 | 72.9 |
| Diffuse Brightness % | 68.9 | 71.3 | 71.5 | 70.6 | 71.4 |
| Opacity % | 85.0 | 86.4 | 86.7 | 85.9 | 86.6 |

This invention has been described in detail with particular reference to certain embodiments, but variations and modifications can be made without departing from the spirit and scope of the invention as defined in the following claims.

What is claimed is:

1. A high brightness composite pigment which comprises a mineral pigment and in-situ precipitated calcium carbonate and which is produced by a plurality of carbonation cycles precipitating a calcium carbonate coating on surfaces of particles of the mineral pigment,
    wherein the composite pigment has a reduced amount of particles of less than 0.2 micron compared to the starting mineral pigment and an equivalent amount of particles of less than 2 microns compared to the starting mineral pigment,
    wherein the composite pigment comprises a uniform coating of precipitated calcium carbonate on the surfaces of the mineral pigment particles, in contrast to non-uniform unevenly distributed discrete calcium carbonate particles or aggregates of calcium carbonate particles on the surfaces of the mineral pigment particles; and
    wherein the content of particles less than 2 microns is at least 84.1% and not more than 93.7%.

2. A composite pigment as defined by claim 1 wherein the mineral pigment is kaolin clay, titanium dioxide, talc, mica or a mixture of two or more of these mineral pigments.

3. A composite pigment as defined by claim 2 wherein the mineral pigment is kaolin clay.

4. A composite pigment as defined by claim 3 wherein the kaolin clay is hydrous kaolin clay.

5. A composite pigment as defined by claim 3 wherein the kaolin clay is delaminated kaolin clay.

6. A composite pigment as defined by claim 3 wherein the kaolin clay is calcined kaolin clay.

7. A composite pigment as defined by claim 3 wherein the kaolin clay is a mixture of hydrous kaolin clay and calcined kaolin clay.

8. A composite pigment as defined by claim 1 wherein the amount of calcium carbonate precipitated on the surfaces of the mineral pigment is from about 5.0 to about 90.0 weight percent based on the weight of the dry composite pigment.

9. A composite pigment as defined by claim 1 wherein the amount of calcium carbonate precipitated on the surfaces of the mineral pigment is from about 10.0 to about 60.0 weight percent based on the weight of the dry composite pigment.

10. A composite pigment as defined by claim 1 wherein the amount of calcium carbonate precipitated on the surfaces of the mineral pigment is from about 20.0 to about 40.0 weight percent based on the weight of the dry composite pigment.

11. A composite pigment as defined by claim 1 wherein the composite pigment additionally comprises titanium dioxide, talc, mica or a mixture of these materials.

12. A composite pigment as defined by claim 1 wherein the difference between the percentage of particles less than 2 microns and the percentage of particles less than 0.2 microns is at least 67.2 and not more than 83.2.

13. A high brightness composite pigment which comprises a mineral pigment and precipitated calcium carbonate particles deposited as a coating on surfaces of particles of the mineral pigment,
    (a) wherein the composite pigment comprises a uniform coating of precipitated calcium carbonate on the surfaces of the mineral pigment particles, in contrast to non-uniform unevenly distributed discrete calcium carbonate particles or aggregates of calcium carbonate particles on the surfaces of the mineral pigment particles; and
    (b) wherein the difference between the percentage of particles less than 2 microns and the percentage of particles less than 0.2 microns is at least 67.2 and not more than 83.2.

14. A composite pigment as defined by claim 13 wherein the mineral pigment is kaolin clay, titanium dioxide, talc, mica or a mixture of two or more of these mineral pigments.

15. A composite pigment as defined by claim 14 wherein the mineral pigment is kaolin clay.

16. A composite pigment as defined by claim 15 wherein the kaolin clay is hydrous kaolin clay.

17. A composite pigment as defined by claim 15 wherein the kaolin clay is delaminated kaolin clay.

18. A composite pigment as defined by claim 15 wherein the kaolin clay is calcined kaolin clay.

19. A composite pigment as defined by claim 15 wherein the kaolin clay is a mixture of hydrous kaolin clay and calcined kaolin clay.

20. A composite pigment as defined by claim 13 wherein the amount of calcium carbonate precipitated on the surfaces of the mineral pigment is from about 5.0 to about 90.0 weight percent based on the weight of the dry composite pigment.

21. A composite pigment as defined by claim 13 wherein the amount of calcium carbonate precipitated on the surfaces of the mineral pigment is from about 10.0 to about 60.0 weight percent based on the weight of the dry composite pigment.

22. A composite pigment as defined by claim 13 wherein the amount of calcium carbonate precipitated on the surfaces of the mineral pigment is from about 20.0 to about 40.0 weight percent based on the weight of the dry composite pigment.

23. A composite pigment as defined by claim 13 wherein the composite pigment additionally comprises titanium dioxide, talc, mica or a mixture of these materials.

24. A composite pigment as defined by claim 13 wherein the content of particles less than 2 microns is at least 84.1% and not more than 93.7%.

25. A high brightness composite pigment which comprises a mineral pigment and in-situ precipitated calcium carbonate and which is produced by a plurality of carbonation cycles precipitating a calcium carbonate coating on surfaces of particles of the mineral pigment,
   wherein the composite pigment has a reduced amount of particles of less than 0.2 micron compared to the starting mineral pigment and an equivalent amount of particles of 1-2 microns compared to the starting mineral pigment,
   wherein the composite pigment comprises a uniform coating of precipitated calcium carbonate on the surfaces of the mineral pigment particles, in contrast to non-uniform unevenly distributed discrete calcium carbonate particles or aggregates of calcium carbonate particles on the surfaces of the mineral pigment particles; and
   wherein the content of particles less than 2 microns is at least 84.1% and not more than 93.7%.

26. A high brightness composite pigment as defined by claim 25, wherein the difference between the percentage of particles in the composite pigment that are less than 2 microns and the percentage of particles in the composite pigment that are less than 0.2 microns is at least 67.2 and not more than 83.2.

* * * * *